(12) United States Patent
Ortt et al.

(10) Patent No.: US 7,100,705 B2
(45) Date of Patent: Sep. 5, 2006

(54) FLEXIBLE POWER TOOL MOTOR PACK AND METHOD OF MAKING THE SAME

(75) Inventors: Earl M. Ortt, Bel Air, MD (US); Michael J. Agnes, Bel Air, MD (US); Michael Zemlok, Towson, MD (US); Mark Williams, Hampstead, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/218,376

(22) Filed: Sep. 2, 2005

(65) Prior Publication Data

US 2006/0000623 A1 Jan. 5, 2006

Related U.S. Application Data

(62) Division of application No. 10/374,340, filed on Feb. 26, 2003.

(51) Int. Cl.
*H02K 5/00* (2006.01)
(52) U.S. Cl. .............................. 173/1; 173/29; 173/216; 173/217; 173/171
(58) Field of Classification Search .................... 173/1, 173/29, 217, 171, 216, 93; 310/50, 89
See application file for complete search history.

(56) References Cited

U.S. PATENT DOCUMENTS

| | | | |
|---|---|---|---|
| 2,155,082 A | 4/1939 | Decker | |
| 2,456,571 A | 12/1948 | Turner et al. | |
| 3,213,305 A | 10/1965 | Riley, Jr. et al. | |
| 3,240,966 A | 3/1966 | Thompson | |
| 3,434,366 A | 3/1969 | Eisenhart et al. | |
| 3,699,366 A | 10/1972 | Wood | |
| 3,829,721 A | 8/1974 | Rosenthal, Jr. et al. | |
| 3,829,722 A | 8/1974 | Rosenthal et al. | |
| 3,873,863 A | 3/1975 | Pew | |
| 3,908,139 A | 9/1975 | Duncan, Jr. | |
| 4,164,670 A | 8/1979 | Maher | |
| 4,342,929 A | 8/1982 | Horne | |
| 5,095,236 A | 3/1992 | Walsh | |
| 5,138,243 A | 8/1992 | Kress et al. | |
| 5,170,851 A | 12/1992 | Kress et al. | |
| 5,196,747 A | 3/1993 | Kress et al. | |
| 5,311,089 A | 5/1994 | Stroetgen et al. | |
| 5,563,461 A | 10/1996 | Daniels | |
| 5,650,676 A | 7/1997 | Blumenberg | |
| 5,755,293 A * | 5/1998 | Bourke ........................ 173/29 |
| 5,818,142 A | 10/1998 | Edleblute et al. | |
| 6,234,037 B1 | 5/2001 | Zimmer | |
| 6,328,655 B1 | 12/2001 | Zimmermann et al. | |

(Continued)

FOREIGN PATENT DOCUMENTS

DE 7345106 7/1974

(Continued)

*Primary Examiner*—Scott A. Smith
(74) *Attorney, Agent, or Firm*—Harness, Dickey & Pierce, P.L.C.

(57) ABSTRACT

A power tool motor pack that includes common components adapted to couple to a first component customized for a first power tool application and to couple to a second component customized for a second power tool application. When the motor pack is used in the first power tool application, the common components are coupled to the first customized component. When the motor pack is used in the second power tool application, the common components are coupled to the second customized component.

9 Claims, 3 Drawing Sheets

U.S. PATENT DOCUMENTS

| | | |
|---|---|---|
| 6,352,127 B1 * | 3/2002 | Yorde .................... 173/216 |
| 6,615,930 B1 * | 9/2003 | Bongers-Ambrosius et al. . 173/198 |
| 6,700,235 B1 | 3/2004 | McAfee |
| 6,713,916 B1 | 3/2004 | Williams et al. |

FOREIGN PATENT DOCUMENTS

| | | |
|---|---|---|
| DE | 8118102.7 | 10/1981 |
| DE | 40 04 464 C2 | 1/1991 |
| DE | 42 23 209 C2 | 2/1993 |
| DE | 196 37 361 C2 | 3/1998 |
| DE | 197 33 546 C1 | 4/1999 |
| EP | 0 387 367 B1 | 9/1990 |
| EP | 0 557 961 B1 | 9/1993 |
| EP | 0 567 048 B1 | 10/1993 |
| EP | 0 925 631 B1 | 6/1999 |
| EP | 0 942 514 | 9/1999 |
| WO | WO 98/31965 | 7/1998 |

* cited by examiner

FLEXIBLE POWER TOOL MOTOR PACK AND METHOD OF MAKING THE SAME

CROSS-REFERENCE TO RELATED APPLICATIONS

This application is a divisional application of U.S. patent application Ser. No. 10/374,340 filed on Feb. 26, 2003.

FIELD OF THE INVENTION

The present invention relates generally to power tools and more particularly to power tool motor packs.

BACKGROUND OF THE INVENTION

A wide variety of power tools are known in the art, many of which are used in professional applications. In professional applications, power tools are typically subjected to heavy usage and high torques. For at least these reasons, customized motor packs are usually specially designed to satisfy the operational requirements of the professional power tool application in which the motor packs will be used. Indeed, developing motor packs for a new line of power tools intended for professional applications often involves designing and/or retooling a substantial number of the motor pack parts and components. Hence, the time, resources, and costs associated with development of such motor packs can be rather extensive and perhaps somewhat prohibitive.

SUMMARY OF THE INVENTION

In accordance with the invention, power tool motor pack for use in at least a first and second power tool application is provided. The power tool motor pack comprises a common component adapted to couple to any one of a first fan baffle customized for the first power tool application and to couple to a second fan baffle customized for the second power tool application. The common component can include a plurality of components as can the customized component for each power tool application. In an aspect of the invention, a customized component can be used in more than one of the power tool applications.

Further areas of applicability of the present invention will become apparent from the detailed description provided hereinafter. It should be understood that the detailed description and specific examples below, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

Corresponding reference characters indicate corresponding features throughout the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
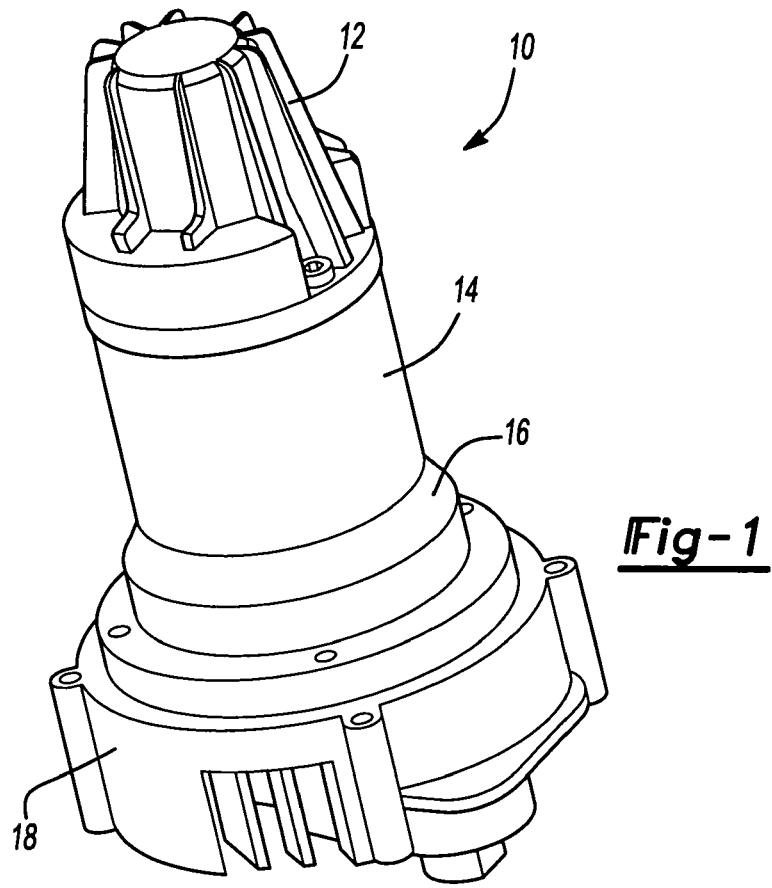
FIG. 1 is a perspective view of a power tool motor pack configured for a power circular saw according to the principles of the present invention.
Figure 2:
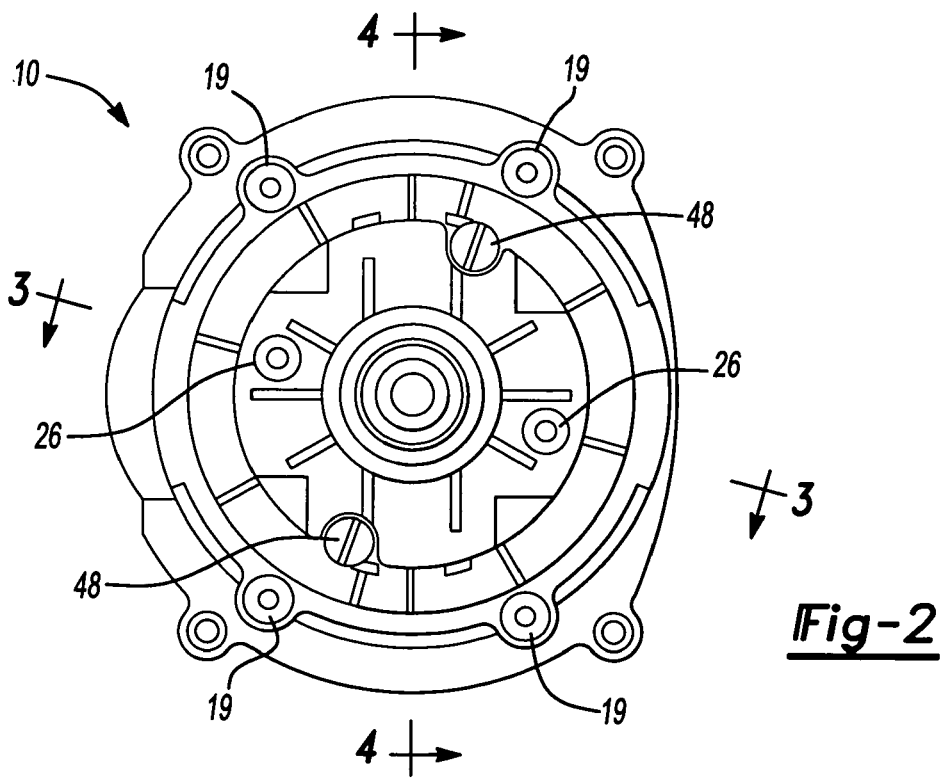
FIG. 2 is a top view of the motor pack shown in FIG. 1.
Figure 5:
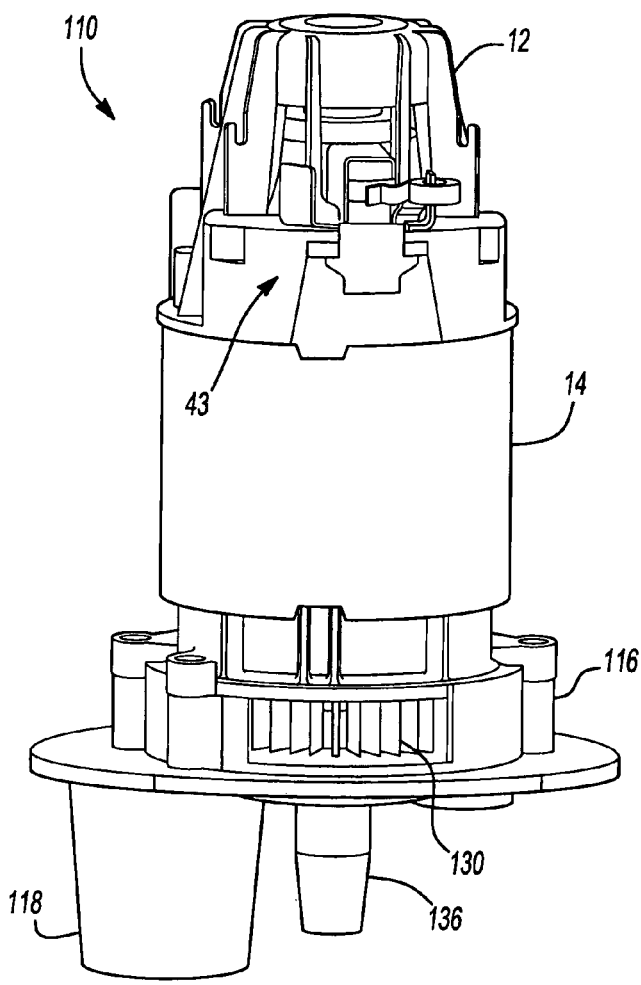
FIG. 5 is a perspective view of a power tool motor pack configured for a power reciprocating saw according to the principles of the present invention.
Figure 6:
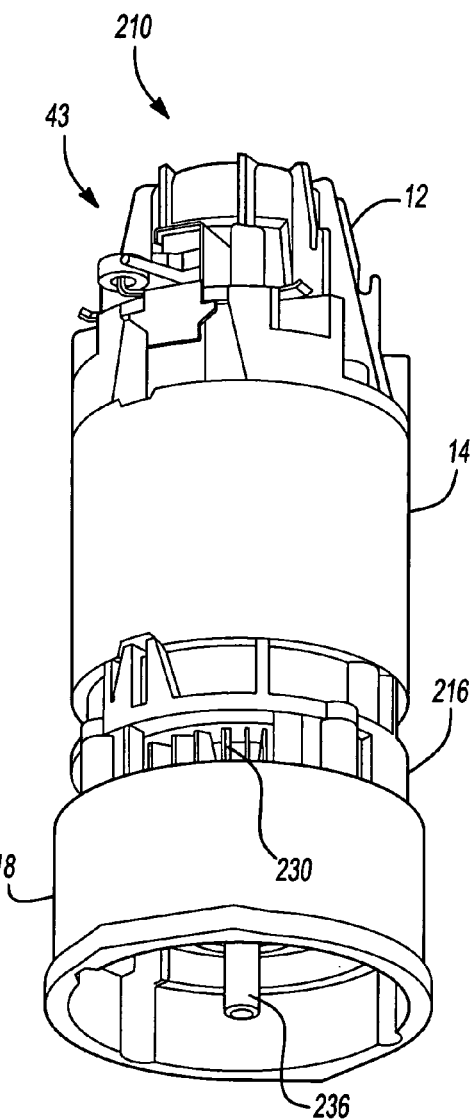
FIG. 6 is a perspective view of a power tool motor pack configured for a power impact wrench according to the principles of the present invention.

Referring generally to FIG. 1, there is shown a power tool motor pack 10 in a configuration intended for a power circular saw according to one embodiment of the present invention. Although FIG. 1 shows the motor pack 10 configured for a power circular saw, the present invention is more generally directed towards a motor pack that includes common components which can be used in any one of a wide variety of different power tool applications. The common components are adapted to couple to components customized for the different power tool applications, which in the exemplary embodiments include a power circular saw (FIGS. 1 through 4), a power reciprocating saw (FIG. 5), and a power impact, wrench (FIG. 6).

By introducing the common components, the present invention eliminates the need for developing these common components each time a new or different motor pack is being developed. In doing so, the present invention thus substantially reduces the amount of resources, time, and costs needed for motor pack development. Indeed, using the present invention may allow motor packs to be developed for different power tool applications with the redesigning and/or retooling of only one or two motor pack components.

Figure 3:
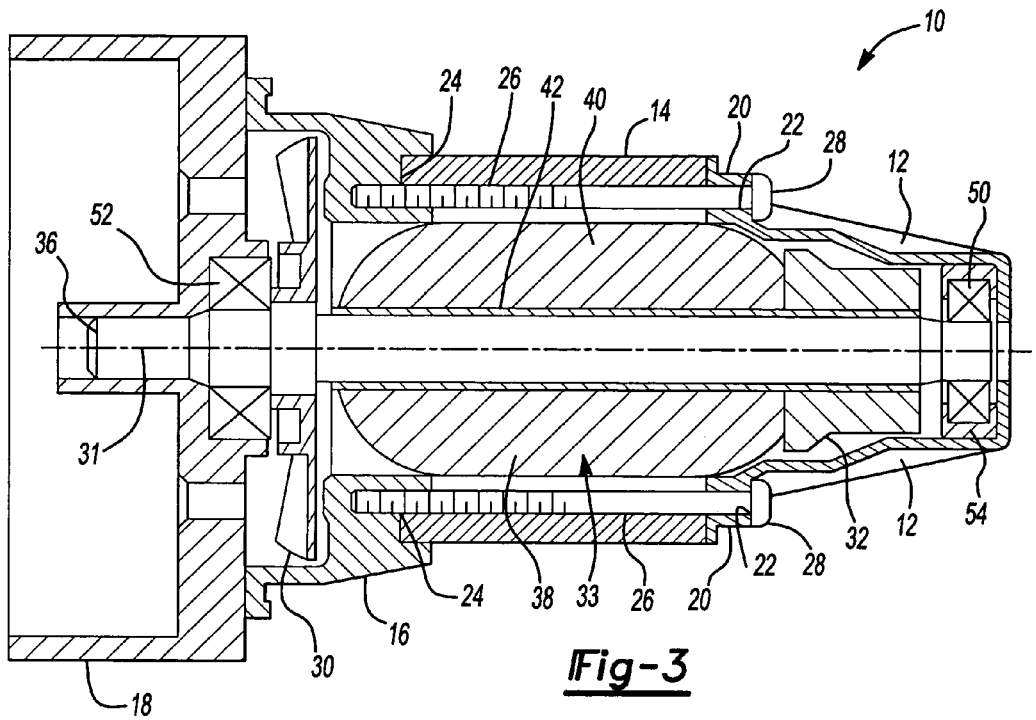
FIG. 3 is a longitudinal cross-sectional view of the motor pack taken along the plane 3—3 in FIG. 2.

In the illustrated embodiments, the commons components of the power tool motor packs 10 (FIG. 1), 110 (FIG. 5), 210 (FIG. 6) include an end cap 12, a brush system 43 (FIG. 4), an armature 33 (FIG. 3) (other than armature shaft 36 and windings 40 of armature 33), a permanent magnet stator 37 and a motor can 14. The end cap 12 typically provides a rear bearing support such as boot 54 (FIG. 3). The end cap 12 and the motor can 14 are adapted to couple to each of a first fan baffle 16, a second fan baffle 116, and a third fan baffle 216. Each fan baffle 16, 116, 216 is customized for the particular power tool application in which it will be used, i.e., a power circular saw, a power reciprocating saw, and a power impact wrench, respectively, in the embodiments described below. It should be understood that the common components can be used in other power tool applications, such as drills, hammer drills, miter saws, jig saws, and others, with the fan baffles used in each such power tool application customized for that application but configured to couple to the end cap 12 and motor can 14.

The fan baffle 16, 116, 216 to which the end cap 12 and motor can 14 are ultimately coupled will depend on which of the motor packs 10, 110, 210 is being assembled. That is, the end cap 12 and motor can 14 are coupled to the first fan baffle 16 in the motor pack 10, are coupled to the second fan baffle 116 in the motor pack 110, and are coupled to the third fan baffle 216 in the motor pack 210.

As described below, a common scheme is established for coupling the common components to the customized components. In an aspect of the invention, this common scheme is to provide the common components and customized components with a common mounting or fastener hole pattern. It should be noted, however, that the manner in which the various customized components are coupled to one another may be unique to the particular power tool application for which the components were customized. In addition, each customized component need not be unique to a single power tool application.

Referring to FIGS. 1 through 4, the circular saw motor pack 10 will now be described in detail. As shown, the motor pack 10 includes the end cap 12, the motor can 14, the fan baffle 16, and a gear case 18, which also functions as a mounting plate and a front bearing support. The gear case 18 is coupled to the fan baffle 16 with suitable fasteners 19, such as threaded screws.

The end cap 12 includes two flange portions 20 (FIG. 3). Each flange portion 20 is provided with one or more holes 22 in a pattern corresponding to bosses or holes 24 provided in the fan baffle 16. Indeed, each fan baffle 16, 116 (FIG. 4), 216 (FIG. 5) is provided with this common fastener hole pattern. This, in turn, allows the end cap 12 and motor can 14 to be coupled to any one of the fan baffles 16, 116, 216 by way of suitable fasteners 26.

In the embodiment shown in FIG. 3, the fan baffle 16 is coupled to the end cap 12 and the motor can 14 as follows. The fasteners 26 extend through the holes 22 provided in the flange portions 20 of the end cap 12, through the motor can 14, and finally into the holes 24 provided in the fan baffle 16. Within the motor can 14, the fasteners 26 pass through gaps or spaces defined between two semi-circular magnet members 35 (FIG. 4) of a permanent magnet stator 37. (While the embodiment of FIGS. 1–4 is illustratively a permanent magnet motor with a permanent magnet stator, it should be understood that the instant invention can also be utilized in other motors, such as a permanent magnet motor having a permanent magnet armature and a wound stator or in a universal motor having a wound armature and stator.) The fasteners 26 also pass through a space defined between an inner surface of the motor can 14 and the laminations 38 and windings 40 of armature 33.

The fasteners 26 may comprise a wide range of suitable fasteners. In the illustrated embodiment, the fasteners 26 comprise threaded screws that self-tap into the corresponding screw bosses or holes 24 in the fan baffle 16. After being threaded into the holes 24, the screw heads 28 are positioned against the flange portions 20, thereby securing the fan baffle 16 to the end cap 12, with the motor can 14 being essentially clamped or sandwiched between the fan baffle 16 and the end cap 12.

Figure 4:
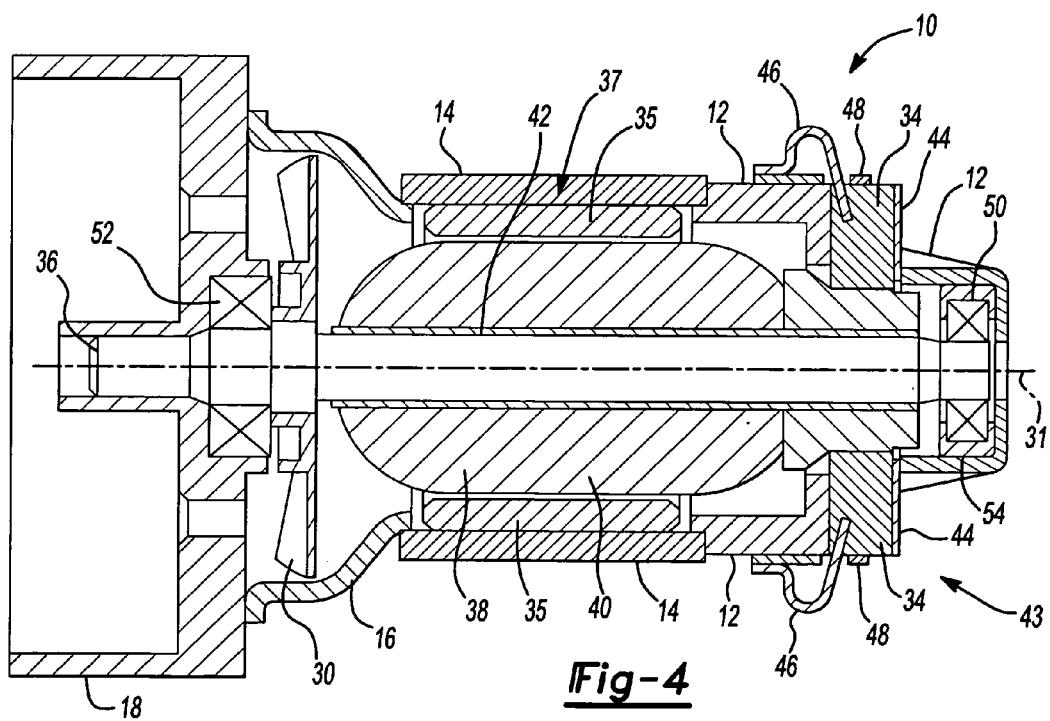
FIG. 4 is a longitudinal cross-sectional view of the motor pack taken along the plane 4—4 in FIG. 2.

Referring now primarily to FIG. 4, the motor pack 10 generates power by utilizing a wound armature 33 and a permanent magnet stator 37 having magnets 35. Armature 33 has an armature shaft 36 around which are positioned laminations 38, in which windings 40 are wound, and a tubular member or sleeve 42 surrounding armature shaft 36. A commutator 32 is affixed on one end of armature shaft 36. Brush system 43 includes a brush 34 at least partially enclosed in a brush box 44, which is electrically connected to a power source. Shunts 46 are used to electrically connect the brushes 34 to their corresponding brush boxes 44. The brush boxes 44 are attached to the end cap 12 in manner that places the brushes 34 in contact with the commutator 32. To ensure that good electrical contact is maintained between the brushes 34 and the commutator 32 even while the commutator 32 is rotating, springs 48 are used to resiliently bias the brushes 34 against the commutator 32. Generally, the commutator brushes 34 transfer power from the power source to the commutator 32 of armature 33 causing the armature 33 to spin. To allow the armature shaft 36 to rotate relatively freely, bearings 50 and 52 are disposed at opposite end portions of the armature shaft 36. The bearing 50 is shown positioned within a boot 54.

The motor pack 10 also includes an axial flow fan 30 that produces an axial airflow (i.e., an airflow parallel with a central longitudinal axis 31 of the motor pack 10). However, the present invention allows a developer to customize the fan and/or fan baffle according to the airflow properties preferable for the intended power tool application. For example, the motor packs 110 (FIG. 5) and 210 (FIG. 6) each include a radial flow 130, 230, respectively, that produces a radial airflow (i.e., an airflow tangentially to the central longitudinal axis of the motor pack).

In addition to the fans 30, 130, 230 and baffles 16, 116, 216, the present invention also allows other motor pack components to be customized as well. Other exemplary motor pack components which may be customized include fan baffles 16, 116, 216, fans 30, 130, 230, armature shafts 36, 136, 236, gear cases 18, 118, 218, front bearing supports, mounting plates, windings 40, and bearing 52, depending at least in part on the particular requirements of the power tool application intended for the motor pack.

In the illustrated embodiments, the components common to each of the motor packs 10, 110, and 210 include the end cap 12, armature 33 (other than armature shaft 36) including but not limited to commutator 32 and laminations 38, brush system 43 (e.g., brushes 34, brush boxes 44, shunts 46, springs 48), permanent magnet stator 37 and the motor can 14. In addition to the end cap 12 and the motor can 14, the motor packs 10, 110, 210 may also include other common components.

It should be understood that depending on the applications, certain of the customized components can be made common and vice-versa. For example, the armature shaft 36 and windings 40 may be common for certain applications instead of custom.

In another preferred form, the present invention provides a method of making motor packs for different power tool applications. The method generally comprises providing at least one common component adapted to couple to a first customized component for a first power tool application and to couple to a second customized component for a second power tool application; coupling the common component to the first customized component when the power tool motor pack is intended for the first power tool application; and coupling the common component to the second customized component when the power tool motor pack is intended for the second power tool application.

In the exemplary embodiments shown and described herein, the method comprises establishing a common scheme for coupling the end cap 12 and the motor can 14 to couple to each of the first, second, and third fan baffles 16, 116, 216; coupling the end cap 12 and motor can 14 to the first fan baffle 16 when the intended power tool application for the motor pack 10 is a power circular saw; coupling the end cap 12 and motor can 14 to the second fan baffle 116 when the intended power tool application for the motor pack 110 is a power reciprocating saw; and coupling the end cap 12 and motor can 14 to the third fan baffle 216 when the intended power tool application for the motor pack 210 is a power impact wrench.

In each of the motor pack configurations 10, 110, 210, a common scheme (e.g., fasteners 26 and a common fastener hole pattern) is used to couple the end cap 12 and motor can 14 to the corresponding fan baffle 16, 116, 216. In addition, the method may further include coupling the fan baffle 16, 116, 216 to other customized components (e.g., gear cases 18, 118, 218, fans 30, 130, 230, mounting plates, front bearing supports, armature shafts 36, 136, 236, etc.). Moreover, the method may also include coupling the end cap 12 and the motor can 14 to other common components (e.g., commutator 32 and laminations 38 of armature 33, brushes 34, brush boxes 44, shunts 46, springs 48, permanent magnet stator 37, and bearing 50).

Because of their substantial similarity in construction, the motor packs 10, 110, 210 can be produced on the same production line with minor tooling changes, as needed, for the customized components. This, in turn, allows for substantial reductions in manufacturing costs.

It is anticipated that the invention will be applicable to a wide range of power tool applications. Accordingly, the specific references to power circular saw, power reciprocating saw, and power impact wrench should not be construed as limiting the scope of the present invention to these specific power tool applications.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. A method of making power tool motor packs for different power tool applications, the method comprising:
   providing at least an end cap and motor can;
   selecting a fan baffle from at least first and second baffles that each have a coupling portion that couples with at least one of the end cap and motor can, the first fan baffle having a portion customized for a first power tool application and the second fan baffle having a portion customized for a second power tool application, the customized portion of the first fan baffle being different than the customized portion of the second fan baffle;
   coupling the at least one of the end cap and motor can to the first fan baffle when the power tool motor pack is intended for the first power tool application; and
   coupling the at least one of the end cap and motor can to the second fan baffle when the power tool motor pack is intended for the second power tool application.

2. The method of claim 1, wherein the coupling portion of the first and second fan baffles includes a flange having a fastener hole pattern that matches a fastener hole pattern in at the at least one of the end cap and motor can and using fasteners to couple the end cap and motor can to the first fan baffle when the power tool motor pack is made for the first power tool application and using the fasteners to couple the end cap and motor can to the second fan baffle when the power tool motor pack is made for the second power tool application.

3. The method of claim 2 wherein the fasteners include threaded screws.

4. The method of claim 2, further including:
   coupling first other customized components to the customized portion of the first fan baffle when the power tool motor pack is intended for the first power tool application; and
   coupling second other customized components to the customized portion of the second fan baffle when the power tool motor pack is intended for the second power tool application.

5. The method of claim 4 wherein coupling first other customized components to the customized portion of the first fan baffle includes coupling a first gear case customized for the first power tool application and coupling second other customized components to the customized portion of the second fan baffle includes coupling a second gear case customized for the second power tool application.

6. The method of claim 4, further including coupling a brush assembly to at least one of the end cap and the motor housing.

7. The method of claim 6, further including disposing a commutator on a first armature shaft customized for the first tool application when the power tool motor pack is intended for the first power tool application, disposing the commutator on a second armature shaft customized for the second tool application when the power tool motor pack is intended for the second power tool application, and disposing the commutator and armature shaft in the end cap and motor housing.

8. A method of making power tool motor packs for at least a power circular saw, a power reciprocating saw and a power impact wrench, the method comprising:
   coupling an end cap and a motor can to a circular saw fan baffle when making the power tool motor pack for the circular saw, the circular saw fan baffle having a flange with a fastener hole pattern that mates with a fastener hole pattern in at least one of the end cap and motor can;
   coupling the end cap and motor can to a reciprocating saw fan baffle when making the power tool motor pack for the reciprocating saw, the reciprocating saw fan baffle having a flange with a fastener hole pattern that mates with the fastener hole pattern in at least one of the end cap and motor can;
   coupling the end cap and the motor can to a power impact wrench fan baffle when making the power tool motor pack for the power impact wrench, the power impact wrench fan baffle having a flange with a fastener hole pattern that mates with the fastener hole pattern in at least of the end cap and motor can;
   each of the circular saw fan baffle, reciprocating saw fan baffle and power impact wrench fan baffle having a customized portion that differs from the customized portion of the customized portions of the other fan baffles.

9. The method of claim 8 including coupling a gear case customized for the circular saw to the circular saw fan baffle when making the power tool motor pack for a circular saw, coupling a gear case customized for the reciprocating saw to the reciprocating saw fan baffle when making the power tool motor pack for the reciprocating saw, and coupling a gear case customized for the power impact wrench to the power impact wrench fan baffle when making the power tool motor pack for the power impact wrench.

* * * * *

UNITED STATES PATENT AND TRADEMARK OFFICE
CERTIFICATE OF CORRECTION

| | | |
|---|---|---|
| PATENT NO. | : 7,100,705 B2 | Page 1 of 1 |
| APPLICATION NO. | : 11/218376 | |
| DATED | : September 5, 2006 | |
| INVENTOR(S) | : Earl M. Ortt et al. | |

It is certified that error appears in the above-identified patent and that said Letters Patent is hereby corrected as shown below:

Column 6,
Line 45, after "least" insert -- one --.

Signed and Sealed this

Twenty-sixth Day of December, 2006

JON W. DUDAS
*Director of the United States Patent and Trademark Office*